Patented Feb. 24, 1931

1,794,292

UNITED STATES PATENT OFFICE

JULIUS HOLLO, OF BUDAPEST, HUNGARY, ASSIGNOR TO EUGENE J. LORAND, OF KENVIL, NEW JERSEY

REMEDY FOR COLDS AND THE LIKE

No Drawing.    Application filed February 15, 1929. Serial No. 340,333.

This invention is a remedy for colds, bronchitis, nasal inflammations, catarrhal conditions, hay fever and the like.

The remedy consists essentially of a combination of atropine and dionine, the dosage of course being in small quantities.

Atropine has valuable properties as a cold remedy, it serving to alleviate the inflammation and congestion of the mucous membranes and to diminish the excessive secretion present during a cold. Atropine, while a valuable remedy, has certain disadvantages; it also dries the membranes of the pharynx, the trachea and the large bronchial tubes. If the cold is in an advanced stage, the atropine may condense the already heavy secretions to a viscous, sticky mass. This tends to irritate the throat and to produce coughing and renders it more difficult to get rid of the phlegm. Atropine has also certain well known effects on the eyes, stomach, etc.

All of the foregoing disadvantages of atropine are overcome by combining it with dionine, the dionine, however, not lessening the desirable effects of the atropine.

Dionine prevents excessive drying of the membranes of the pharynx, trachea and bronchial tubes, and aids the patient in loosening the secretions and phlegm and expectorating them. Dionine has a quieting physiological effect, relieving coughing and counteracting the usual effects of atropine on the breathing center, eyes, stomach and bronchi, and in general counteracts the toxic effects of atropine.

Dionine however is synergetic with atropine to a certain extent, in that it too has a certain drying effect on membranes of the nose, although not to such a marked degree as has atropine.

The use of dionine alone has an undesirable effect on the intestinal tract, tending to cause constipation or pylorus spasmus. This bad result of dionine is counteracted by and overcome by the atropine.

Dionine is not habit forming, being a diethyl morphine.

It will therefore be seen that the undesirable side effects of atropine are overcome by and counteracted by the dionine; the undesirable side effects of the dionine are overcome by and counteracted by the atropine; and both act together in allaying the inflammation and secretions of the mucous membranes of the nose, throat, trachea and bronchi. The combination of the two represents therefore a distinct advance over the use of either one alone, and produces results far superior to the use of either one alone. The dionine intensifies the action of the atropine, so that very small amounts of atropine may be used, so small as not to affect the eyes or dry the mouth.

The remedy has been used with distinct success in cases of hay fever. If used before the hay fever season starts, it often entirely prevents the attack. If the sneezing has already begun, the resultant unpleasant symptoms, such as congested and over-sensitive membranes and streaming eyes, are at once very greatly relieved.

The remedy has also been used with success in bronchitis, where it lessens coughing without hindering free loosening and removal of the secretions.

The remedy is not indicated for infants. The dosage for children from 6–12 years is:

Atropine sulfate_____ 0.0002 g.
Dionine_____ 0.003  g.

For adults:

Atropine sulfate (or extract belladonna 0.02 g.)_____ 0.0004 g.
Dionine_____ 0.01   g.

The remedy is used internally, preferably in a capsule. If the desired relief is not had within an hour, the dose can be repeated. Not more than three doses, however, should be taken in one day.

It is to be understood that various substances or materials may be added to applicant's essential ingredients as claimed without departing from the spirit or scope of the invention. Coloring material or inert substances as salt or sugar might, of course, be added without interference with the physiological effects of applicant's medicinal remedy.

I claim as my invention:

1. A remedy for colds, hay fever, bronchitis and the like, consisting essentially of one part atropine to approximately 15 to 25 parts of dionine.

2. A medicinal remedy consisting essentially of atropine together with dionine in sufficient amount to counteract undesirable physiological effects thereof.

3. A medicinal remedy consisting essentially of atropine and dionine, the dionine being in sufficient amount to counteract the usual undesirable physiological effects of atropine and limited to an amount in which the atropine overcomes the undesirable physiological effects of dionine alone.

In testimony whereof I affix my signature

JULIUS HOLLO.